United States Patent [19]

King et al.

[11] Patent Number: 4,819,182

[45] Date of Patent: Apr. 4, 1989

[54] METHOD AND APPARATUS FOR REDUCING VIBRATION OF A HELICOPTER FUSELAGE

[75] Inventors: Stephen P. King, Stoke-Sub-Hamdon; Christopher I. Hughes, Yeovil, both of England

[73] Assignee: Westland plc, Somerset, England

[21] Appl. No.: 10,699

[22] Filed: Feb. 4, 1987

[51] Int. Cl.$^4$ .................. F16F 15/10; B04D 47/00
[52] U.S. Cl. ........................ 364/508; 244/17.11; 248/566
[58] Field of Search ............. 364/508; 244/17.27, 244/17.13, 17.11; 73/769, 772; 248/550, 560–563, 665, 669, 566

[56] References Cited

U.S. PATENT DOCUMENTS

| | | | |
|---|---|---|---|
| 4,311,213 | 1/1982 | Desjardins et al. | 188/380 |
| 4,365,770 | 12/1982 | Mard et al. | 244/17.11 |
| 4,483,425 | 11/1984 | Newman | 188/378 |
| 4,546,960 | 10/1985 | Abrams et al. | 267/136 |
| 4,699,257 | 10/1987 | Lloyd | 188/380 |

OTHER PUBLICATIONS

Morison et al., "Comparison of Optimized Active and Passive Vibration Absorbers", 1973, Conference of the Automotive Control Council, pp. 932–938.

Primary Examiner—Parshotam S. Lall
Assistant Examiner—Thomas G. Black
Attorney, Agent, or Firm—Larson & Taylor

[57] ABSTRACT

This invention relates to a method and apparatus for reducing vibration of a helicopter fuselage. The apparatus comprises a plurality of actuators interconnecting parts of the helicopter structure capable of relative motion at an exciting frequency, means to continuously oscillate the actuators at a frequency corresponding to the exciting frequency, a plurality of accelerometers attached to the fuselage for generating signals representative of fuselage dynamic accelerations, and processing means for processing said signals and providing output signals for controlling the phase and magnitude of operation of the actuators. In a described embodiment, one of the relatively movable parts comprises a raft structure carrying the gearbox and engines and attached to the fuselage by a resilient attachment adjacent each of its four corners.

17 Claims, 3 Drawing Sheets

METHOD AND APPARATUS FOR REDUCING VIBRATION OF A HELICOPTER FUSELAGE

This invention relates to a method and apparatus for reducing or eliminating vibration of a helicopter fuselage.

Many sources of vibration exist in a helicopter but the most important component in forward flight is that generated by the main rotor at the blade passing frequency. The blade passing frequency is equal to the product of the number of main rotor blades and the rotor rotational speed, and forces and moments are transmitted usually through the gearbox and gearbox/fuselage attachments to produce vibration of the fuselage.

Ignoring local moments, each gearbox/fuselage attachment, whether it be rigid or flexible, transmits three orthogonal shears each of which excites a forced response of the fuselage, which is a highly complex dynamic structure. Thus, a multiplicity of load paths exist through which an exciting vibrating frequency is transmitted to the fuselage, for example, in an installation having four gearbox/fuselage attachments, at least twelve load paths are operative.

The trend for increasing cruise speeds has aggravated the problem since the vibratory rotor loads increase very rapidly as the forward speed of the helicopter increases.

Many prior proposals have been made addressing this problem. These include vibration absorbers of which the most popular are those mounted close to the source of vibration on the rotor head itself such as are disclosed for example in GB-A Nos. 1264637 and 1528057. All vibration absorbers and especially head mounted absorbers involve some weight penalty and the latter also result in increased aerodynamic drag. Such passive absorbers can at best only be considered as palliatives and they are unlikely to produce overall fuselage vibration levels low enough to satisfy ever more stringent requirements of operators.

Fuselage isolation systems based on complicated anti-resonant principles such as are disclosed for example in GB-A Nos. 2004976, 2043574, EP-A Nos. 006088 and 034092 have been used with mixed success. Such systems are usually mounted at the gearbox/fuselage interface and, being passive systems, produce loads which are related only to the displacements at the attachment points. This of course means that any non-isolated path e.g. of the twelve paths referenced hereinbefore, connecting the rotor to the fuselage can seriously degrade the performance. Simple soft-mounting systems do not suffer from this problem but on the other hand it is extremely difficult to obtain sufficient attenuation without using unacceptably soft springs. Another problem with anti-resonant systems is the detrimental effect on the resulting vibration attenuation of variations in rotor speed.

GB-A No. 1182339 describes an active vibration reducing system including an accelerometer to measure vibration at a selected location on the fuselage, electronic means to convert said signal into changes in hydraulic pressure and means for transmitting these signals to a double-acting jack operative between a rotor support and the fuselage to produce pulses countering the measured vibration. This specification utilises a fixed gain and phase single-input single-output analogue system which is therefore capable of reducing one measured vibration only and at one selected location in the fuselage and takes no account of vibration at other locations which could consequently suffer from increased levels of vibration. Furthermore the restrictions imposed by the choice of a fixed gain and phase feature of the electrical signals used to generate the jack commands means that the prior system caters only for fixed fuselage dynamic characteristics and fixed rotor forcing characteristics. Many features, including the type of cargo being carried or a changing fuel load, can significantly alter the dynamics of a helicopter fuselage which could either considerably reduce the effectiveness of the prior system or in some cases could actually increase the vibration since it cannot guarantee, due to such external disturbances, that the forces produced by the jack actually correspond to the commanded force due to the signal from the accelerometer.

Accordingly, in one aspect, the invention provides a method of reducing vibration of a helicopter fuselage characterised by the steps of connecting a plurality of actuators between parts of the helicopter structure capable of relative motion at an exciting frequency, continuously oscillating the plurality of actuators at a frequency substantially corresponding to the exciting frequency, generating signals representative of dynamic accelerations at a plurality of locations on the fuselage and feeding said signals to on board processing means adapted to provide output signals for controlling the phase and magnitude of the applied actuator forces and for varying the phase and magnitude characteristics of said forces so as to compensate for changes in fuselage dynamics whereby the overall level of fuselage vibration is reduced.

In another aspect, apparatus for reducing rotor induced vibration of a helicopter fuselage is characterised by a plurality of actuators interconnecting parts of the helicopter structure capable of relative motion at an exciting frequency, a power source adapted to continuously oscillate the actuators at a frequency corresponding substantially to the exciting frequency, a plurality of accelerometer attached to the fuselage for generating signals representative of fuselage dynamic accelerations, and processing means for processing said signals and providing output signals for controlling the phase and magnitude of the actuator output forces and for automatically adjusting the phase and magnitude so as to compensate for changing fuselage dynamic characteristics.

In yet another aspect, a helicopter having a main sustaining rotor connected to a fuselage is characterised by a plurality of actuators connected between parts of the structure capable of relative motion at a frequency corresponding substantially with a frequency exciting the fuselage to vibrate, power source means continuously oscillating the actuators at a frequency corresponding substantially with an exciting frequency, a plurality of accelerometers attached to the fuselage for generating signals representative of fuselage dynamic accelerations, and on board processing means for processing said signals and providing output signals for controlling the phase and magnitude of the actuator output forces and for automatically adjusting the phase and magnitude of the actuator output forces to compensate for changing dynamic characteristics of the helicopter fuselage.

In the simplest form of the invention the exciting frequency may be a pre-selected dominant frequency such as the rotor passing frequency: however, in another form the exciting frequency may comprise an instantaneous value from a pre-selected range of exciting frequencies, and the term exciting frequency used herein is to be construed accordingly.

Conveniently, one of said relatively movable parts comprises a raft structure supporting the gearbox and engines and which is attached to the fuselage by a resilient connection adjacent each of its four corners. The resilient connection may comprise elastomeric units and, conveniently, an actuator may be located adjacent each unit.

Thus, the present invention provides an active system that does not attempt to isolate the fuselage from rotor induced forces but instead applies additional forces to the fuselage such that the forced response generated cancels as far as possible the response to rotor induced forces. Contrary to the prior art system of GB-A No. 1182339 the present invention utilises a plurality of actuators each adapted to generate forces at an exciting frequency, e.g. the blade passing frequency, applies the force to the fuselage and includes on-board processing means to compute from signals from a plurality (say ten or twelve) accelerometers, output signals for controlling the phase and magnitude of the forces generated by the actuators whereby the vibration at the plurality of locations of the accelerometers in the fuselage is simultaneously reduced.

Furthermore, the present system is adaptive in that it determines its own gain and phase shift characteristics to automatically compensate for changes in fuselage dynamics and rotor forcing characteristics.

Therefore in contrast with the prior art system which is only effective at one selected location and which is capable of reducing vibration at the one location only as long as one very tightly controlled set of pre-conditions exists, our invention reduces vibration at a plurality of locations simultaneously and automatically compensates for changes in operating conditions. This is achieved by incorporating a plurality of actuators each inputting a force at an exciting frequency, e.g. the rotor passing frequency, and varying the phase and magnitude of the forcing signals in accordance with the measured inputs at the plurality of accelerometers.

The control forces from the actuators can be applied at any point and in any direction but must be between parts of the helicopter structure capable of relative motion at the exciting frequency. In one embodiment the actuators are mounted between the fuselage and the gearbox in parallel with existing resilient mounts, so that the gearbox itself constitutes a mass capable of reacting the force applied by the actuators. The stiffness of the mounting system is not critical, so that static deflection problems, are avoided, but must be sufficiently low to allow relative motion between the parts, e.g. the mass constituted by transmission system and the fuselage, at a frequency corresponding to the exciting frequency.

The invention will now be described by way of example only and with reference to the accompanying drawings in which, FIG. 1, is a fragmentary side elevation of a helicopter fitted with vibration reducing apparatus according to one embodiment of the invention.

Figure 1:
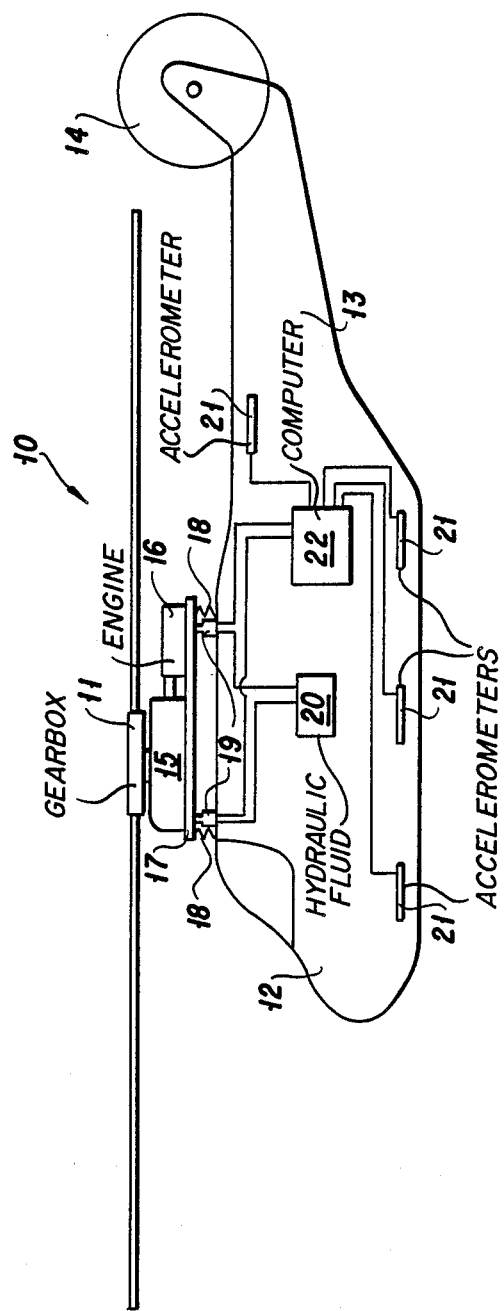

A helicopter, generally indicated at 10, includes a main sustaining rotor 11 supporting a fuselage 12 having a rearwardly extending tail boom 13 carrying an anti-torque rotor 14.

The sustaining rotor 11 is driven through a gearbox 15 by one or more engines 16, the gearbox 15 and engine(s) being supported on a raft structure 17. The raft is attached to the fuselage by four resilient connections each comprising an elastomeric unit 18 (shown schematically) through which operational forces are transmitted from the sustaining rotor 11 to the fuselage 12.

Thus the fuselage 12 and the raft 17 comprise respective parts of the overall structure that are capable of relative motion at a frequency corresponding substantially with a vibration exciting frequency.

A vertically extending electro-hydraulic actuator 19 is attached between the fuselage 12 and the raft 17 adjacent each of the four elastomeric units 18 and is adapted during operation to apply a vertical force to the fuselage 12 that is reacted by an equal and opposite force on the raft 17.

A supply 20 of pressurised hydraulic fluid is connected to each of the four actuators 19.

Twelve accelerometers 21 (four only being shown) are attached at various locations to the floor of the cockpit and cabin of fuselage 12, ten measuring vertical vibration and one each for lateral and longitudinal vibration.

The accelerometers 21 are operatively connected to a computer 22 which in turn is connected to each of the four actuators 19.

In operation, vibratory forces are produced by the main sustaining rotor 11 due, for example, to assymetric airflow in forward flight. Since a helicopter fuselage is dynamically complex with many modes of vibration, vibratory or oscillatory forces applied to the fuselage 12 create forced responses in all modes. These forces and related moments are predominantly at the blade passing frequency and harmonics thereof; the blade passing frequency being a product of the rotational speed of the rotor and the number of blades.

For example, in the particular four-bladed helicopter described, the blade passing frequency is approximately 21 Hz.

In the illustrated embodiment, the vibration exciting frequency is transmitted by the resilient elastomeric units 18 to the fuselage 12 through three orthogonal shear forces, at each of the four mounts. In addition a small couple is transmitted by each mount, again in three orthogonal directions.

The four electro-hydraulic actuators 19 are oscillated continuously at a pre-selected exciting frequency to apply a set of controllable forces which create responses of the fuselage 12 in a manner similar to the responses to the rotor forces and moments. Since a force needs to be reacted against an inertia it is convenient, in the illustrated embodiment, to utilise the raft 17 and assembled components as an inertia mass and to attach the electro-hydraulic actuators 19 to produce the necessary controllable force between the fuselage 12 and the raft 17.

In the described embodiment the frequency of oscillation of the actuators is selected to be substantially equal to the blade passing frequency, e.g. 21 Hz, and considerably reduces the vibration levels at the respective locations in the fuselage that result from that particular forcing frequency. In an alternative embodiment, time-varying forces are generated by the actuators and comprise any combination of exciting frequencies from within a pre-selected range as defined by the instantaneous value of the acceleration in time, whereby vibration levels resulting from any forcing frequency with the range of frequencies is considerably reduced.

Figure 2:
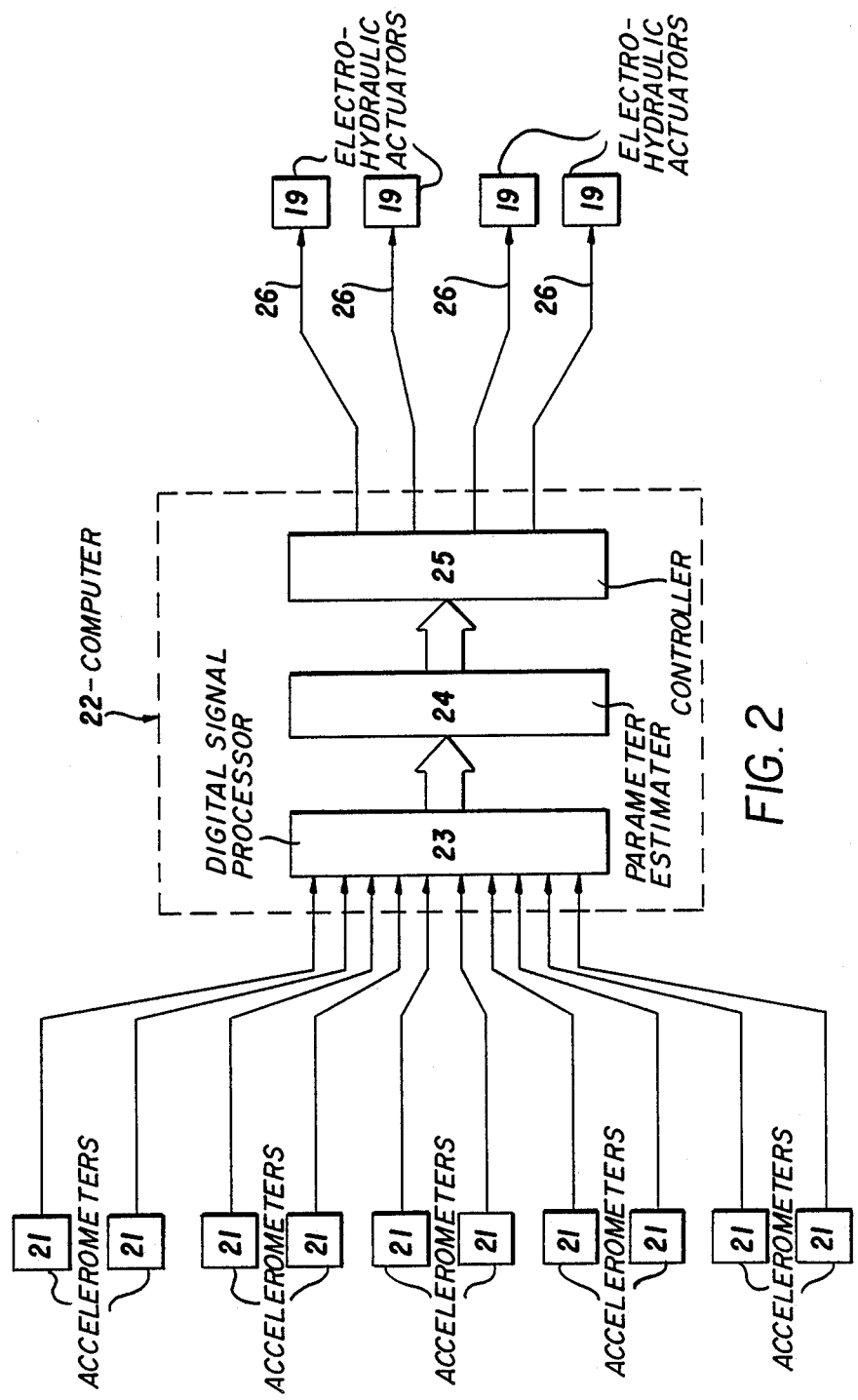
FIG. 2 is a simplified block diagram of the apparatus of FIG. 1.

An important feature of the present invention is that accelerations corresponding to actual vibration levels at each of the respective selected locations of the accelerometers 21 in the fuselage 12, are converted to electrical signals which are transmitted to the computer 22. The computer 22 is programmed to process the signals from the accelerometers 21 and to provide appropriate output signals to adjust the phase and magnitude of operation of the four electro-hydraulic actuators 19, and the means by which this adaptivity of operation is achieved will now be described with reference to FIG. 2.

The signals from the plurality of accelerometers 21 are fed to the microprocessor based adaptive controller 22. These measured vibration signals are analysed by a digital signal processor 23 based on a Discrete Fourier Transform theory for rotor blade passing frequency and phase information. This measured frequency domain vibration data is then fed to a parameter estimator 24 which utilises the information to construct a linear transfer relationship for the airframe vibration responses and the output forces from the actuators 19. The calculation of the transfer relationship estimates are based on discrete Kalman filter theory.

The resultant estimates are fed to an optimal controller 25 which calculates the optimal control forces which minimise a quadratic performance function that comprises the weighted sum of the squares of the measured vibrations and the actuator output forces and produces appropriate signals 26 to operate the actuators 19.

This control procedure continues on a cyclic basis wherein during one filter cycle a constant set of oscillatory forces are applied to the fuselage structure as the calculations of 23, 24 and 25 are conducted.

The use of parameter estimator 24 in the control loop of the apparatus of this invention ensures that the phase and magnitude response characteristics of the set of actuator input signals 26 and therefore the actuator output forces are continuously varied to cater for changing fuselage dynamic characteristics. Thus, in the event of a change in the airframe linear transfer relationship the parameter estimator 24 detects an error between the predicted vibration level and the measured vibration level. The estimates for the relationship are adjusted accordingly and substituted into the optimal controller 25 which then calculates a new set of actuator input signals 26.

Thus, the method and apparatus of this invention impose changes in the phase and the magnitude of the exciting frequency osillations of the four electro-hydraulic actuators 19 to simultaneously cancel or substantially reduce the level of vibration at each of the respective locations of the accelerometers 21 thereby providing a significant improvement in the overall vibration level of a helicopter fuselage.

The invention treats vibration "as measured" on the fuselage and produces forces in response to the measured vibrations rather than in response to exciting frequencies which may or may not create responses, and differs from passive devices which require a parasitic mass for their operation and can only produce forces in response to their own motion.

Furthermore the invention is capable of cancelling vibration created by other mechanisms, e.g. the higher harmonics of blade passing frequency and pressure fluctuations on a large tail surface, which cannot be treated by conventional isolation systems. The computer applies optimal control which allows to be minimised a number of vibration measurements larger than the number of control degrees of freedom available.

The vibration measurements may be appropriately "weighted" for relative importance.

The computer automatically demands an oscillating frequency related to the speed of rotation of the rotor so that rotor speed variations can be accommodated by the present invention which is not possible with mass/spring type passive isolators. It will be noted also that the invention is capable of reducing vibration of an uncontrolled mass itself, and this may be of particular benefit in the described embodiment in which the mass is constituted by the resiliently mounted gearbox/engine assembly.

In comparison with the prior system of GB-A No. 1182339, the method and apparatus of this invention incorporates adaptivity in the control system by providing variable gain and phase shift characteristics to automatically cater for the varying dynamic characteristics of the helicopter structure in which it is fitted and ensures a reduction of vibration at a plurality of vibration control points.

Figure 3:
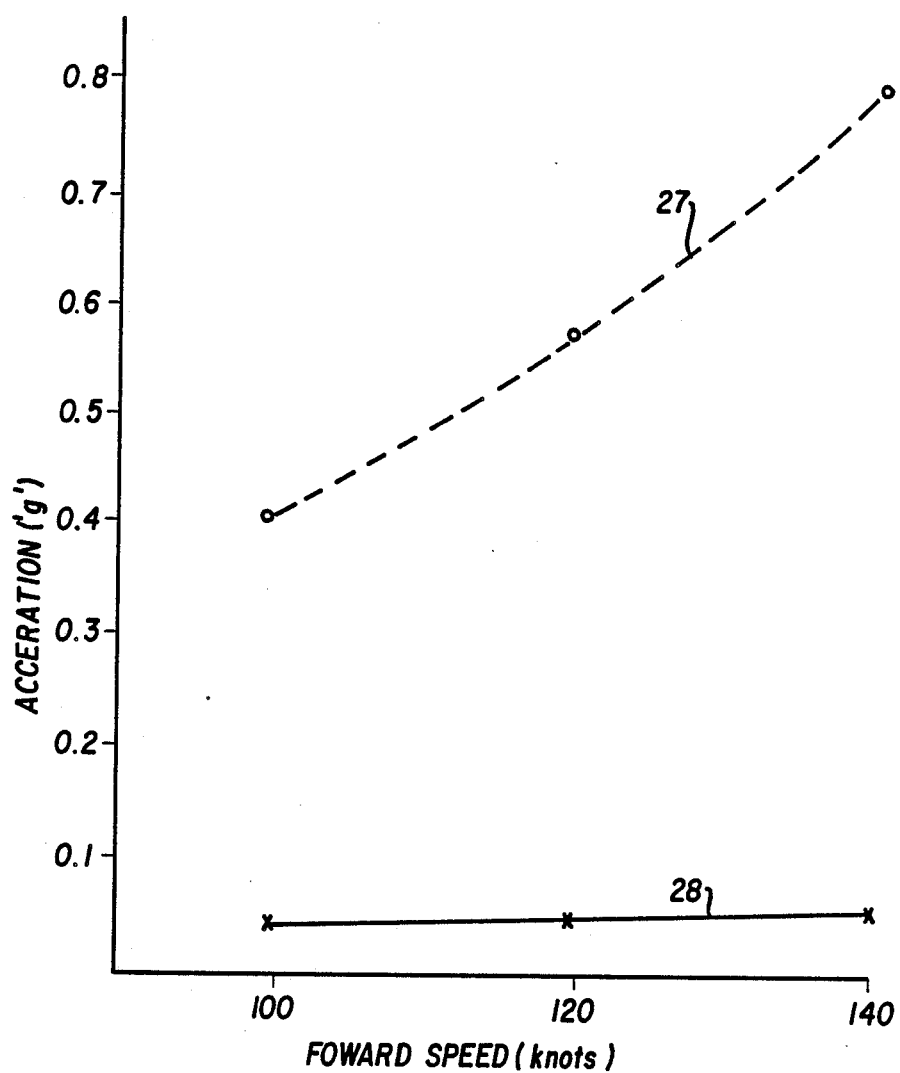
FIG. 3 is a graph showing predicted vibration levels in a particular helicopter with and without the benefit of the present invention.

The effects of this adaptive control philosopy are illustrated in FIG. 3 which shows predicted mean 4R vibration levels at twelve accelerometer positions on a particular helicopter by plotting acceleration against forward speed for a basic aircraft (line 27) and for the same aircraft fitted with the vibration cancellation system of this invention (line 28). Apart from the significant reduction in overall levels of vibration achieved by this invention it is to be noted that the adaptive control philosophy ensures that the low vibration levels achieved are practically constant throughout the speed range, whereas the vibration levels of the basic helicopter increase steeply throughout the speed range.

Another important feature, especially from airworthiness considerations, is that the electro-hydraulic actuator 19 are not located in the primary load path and do not therefore have to cater for flight loads, which, in the described embodiment, are carried by resilient elastomeric units which also provide the flexibility of the mass essential to the invention.

Whilst one embodiment of the invention has been described and illustrated it will be understood that many modifications may be made without departing from the scope of the invention as defined by the appended Claims. For example, whilst in the described embodiment, the resiliently mounted gearbox and engine provide a convenient resiliently mounted mass to react the controlled forces provided by the electro-hydraulic actuators, the invention is not limited to such a configuration and any other parts of the structure capable of relative motion at a frequency corresponding to the vibration exciting frequency and of reacting the actuator forces can be used. Furthermore the invention does not require a parasitic mass. From this it will be understood that the invention is also applicable to a helicopter in which the gearbox etc is rigidly attached to the fuselage.

The number of actuators can be varied and can be oriented in any desired or convenient direction. Similarly, the number of accelerometers can be varied although preferably the number will be not less than the number of actuators.

In an embodiment similar to that hereinbefore described in which the electro-hydraulic actuators are located adjacent the resilient units, it is envisaged that the respective resilient elastomeric unit and the electro-hydraulic actuator would be integrated in a single assembly.

What is claimed is:

1. A method of reducing vibration of a structure comprises the steps of connecting a plurality of actuators between parts of the structure capable of relative motion at an exciting frequency, continuously oscillating the plurality of actuators at a frequency substantially corresponding to the exciting frequency, generating signals representative of dynamic accelerations at a plurality of locations on the structure and feeding said signals to on board processing means providing output signals for controlling the phase and magnitude of applied forces generated by the actuators and for varying the phase and magnitude characteristics of said forces so as to compensate for changes in structure dynamics whereby the overall level of structural vibration is reduced.

2. A helicopter comprising a structure including a main sustaining rotor supporting a fuselage, a plurality of actuators connected between parts of the structure capable of relative motion at a frequency corresponding substantially with a frequency exciting the fuselage to vibrate, power source means continuously oscillating the actuators at a frequency corresponding substantially with the exciting frequency, a plurality of accelerometers attached to the fuselage at selected locations for generating signals representative of fuselage dynamic accelerations, and on board processing means for processing said signals and providing output signals for controlling phase and magnitude of the output forces generated by the actuators and for automatically adjusting the phase and magnitude of the actuator output forces to compensate for changing dynamic characteristics of the helicopter fuselage.

3. A helicopter as claimed in claim 2, wherein said exciting frequency corresponds substantially with the rotor blade passing frequency.

4. A helicopter as claimed in claim 2, wherein said exciting frequency comprises an instantaneous value from a pre-selected range of exciting frequencies.

5. A helicopter as claimed in claim 2, wherein one of said relatively movable parts comprises a raft structure carrying the gearbox and engines and attached to the fuselage by a resilient attachment adjacent each of its four corners.

6. A helicopter as claimed in claim 5, wherein each said resilient attachment comprises an elastomeric unit.

7. A helicopter as claimed in claim 6, wherein said resilient attachments and said actuators are equal in number.

8. A helicopter as claimed in claim 7, wherein each said resilient attachment and actuator are integrated in a single unit.

9. A helicopter as claimed in claim 2, said actuator comprises an electro-hydraulic actuator.

10. A helicopter as claimed in claim 2, wherein the number of accelerometers is not less than the number of actuators.

11. Apparatus for reducing vibration of a vehicle structure comprising a plurality of actuators interconnecting parts of the structure capable of relative motion at an exciting frequency, a power source adapted to continuously oscillate the actuators at a frequency corresponding substantially to the exciting frequency, a plurality of accelerometers attached to the structure for generating signals representative of structure dynamic accelerations, and processing means for processing said signals and providing output signals for controlling the phase and magnitude of output forces generated by the actuators and for automatically adjusting the phase and magnitude so as to compensate for changing structural dynamic characteristics.

12. Apparatus as claimed in claim 11, wherein each said actuator comprises an electro-hydraulic actuator.

13. Apparatus as claimed in claim 11, wherein said relatively movable parts of the structure are attached by resilient attachment means.

14. Apparatus as claimed in claim 2, wherein each said resilient attachment means comprise an elastomeric unit.

15. Apparatus as claimed in claim 2, wherein said resilient attachments and said actuators are equal in number.

16. Apparatus as claimed in claim 15, wherein each said resilient attachment and actuator are integrated in a single unit.

17. Apparatus as claimed in claim 11, wherein the number of accelerometers is not less than the number of actuators.

* * * * *

UNITED STATES PATENT AND TRADEMARK OFFICE
CERTIFICATE OF CORRECTION

PATENT NO. : 4,819,182

DATED : April 4, 1989

INVENTOR(S) : KING, Stephen

It is certified that error appears in the above-identified patent and that said Letters Patent is hereby corrected as shown below:

Add to the cover page:

RELATED U.S. APPLICATION DATA
Continuation-in-part of Serial No. 747,231, June 21, 1985, now abandoned.

In the claims:

Claim 7, line 1, change "6" to --5--.

Claim 9, line 1, before "said" insert --wherein each--.

Claim 14, line 1, change "2" to --13--.

Claim 15, line 1, change "2" to --13--.

Signed and Sealed this

Second Day of January, 1990

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,819,182

DATED : April 4, 1989

INVENTOR(S) : KING, Stephen

It is certified that error appears in the above-identified patent and that said Letters Patent is hereby corrected as shown below:

The following should be added to the title page:

RELATED U.S. APPLICATION DATA

Continuation-in-part of Serial No. 747,231, June 21, 1985, now abandoned.

FOREIGN APPLICATION PRIORITY DATA

June 29, 1984 Great Britain....................8416679

In the claims:

Claim.7, line 1, change "6" to --5--.
Claim 9, line 1, before "said" insert --wherein each--.
Claim 14, line 1, change "2" to --13--.
Claim 15, line 1, change "2" to --13--.

This certificate supersedes Certificate of Correction issued January 2, 1990

Signed and Sealed this

Third Day of April, 1990

*Attest:*

HARRY F. MANBECK, JR.

*Attesting Officer*  *Commissioner of Patents and Trademarks*